United States Patent
Bostick et al.

(10) Patent No.: US 11,151,364 B2
(45) Date of Patent: Oct. 19, 2021

(54) VIDEO IMAGE OVERLAY OF AN EVENT PERFORMANCE

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 16/531,721

(22) Filed: Aug. 5, 2019

(65) Prior Publication Data

US 2019/0354752 A1  Nov. 21, 2019

Related U.S. Application Data (63) Continuation of application No. 15/459,388, filed on Mar. 15, 2017, now Pat. No. 10,423,822.

(51) Int. Cl.
*G06K 9/00* (2006.01)
*G06F 16/783* (2019.01)
(Continued)

(52) U.S. Cl.
CPC ....... *G06K 9/00335* (2013.01); *G06F 16/784* (2019.01); *G06K 9/00288* (2013.01);
(Continued)

(58) Field of Classification Search
None
See application file for complete search history.

(56) References Cited

U.S. PATENT DOCUMENTS

2010/0088159 A1  4/2010  Henshaw et al.
2011/0078151 A1  3/2011  Bilbrey
(Continued)

FOREIGN PATENT DOCUMENTS

WO  2011/031932  3/2011
WO  2015/120413  8/2015

OTHER PUBLICATIONS

List of IBM Patents or Patent Applications Treated as Related, dated Aug. 5, 2019 1 page.

(Continued)

*Primary Examiner* — Soo Jin Park
(74) *Attorney, Agent, or Firm* — Anthony England; Andrew D. Wright; Roberts Calderon Safran & Cole, P.C.

(57) ABSTRACT

Systems and methods for overlaying video segments of actions of audience members with video segments of an event performer are described. A computer implemented method includes: identifying, by a computer device, an event performer in video content; identifying, by the computer device, an audience member in the video content that has a social network relationship to the event performer; correlating, by the computer device, an action of the event performer in the video content to an action of the audience member in the video content; and generating, by the computer device, a composite image comprising an image of the action of the event performer and an image of the action of the audience member.

20 Claims, 5 Drawing Sheets

(51) Int. Cl.
   *H04N 21/44*      (2011.01)
   *H04N 21/4788*    (2011.01)

(52) U.S. Cl.
   CPC ..... *G06K 9/00302* (2013.01); *G06K 9/00677* (2013.01); *G06K 9/00765* (2013.01); *G06K 2209/27* (2013.01); *H04N 21/44008* (2013.01); *H04N 21/4788* (2013.01)

(56) References Cited

U.S. PATENT DOCUMENTS

| | | |
|---|---|---|
| 2012/0263433 A1 | 10/2012 | Mei et al. |
| 2013/0014142 A1 | 1/2013 | Newell |
| 2013/0166349 A1 | 6/2013 | Martin |
| 2013/0227595 A1 | 8/2013 | Nielsen et al. |
| 2013/0262588 A1 | 10/2013 | Barak et al. |
| 2014/0137144 A1 | 5/2014 | Jarvenpaa et al. |
| 2014/0280054 A1* | 9/2014 | Karunakaran ...... G06F 16/9038 707/722 |
| 2015/0347827 A1 | 12/2015 | Dickinson et al. |
| 2017/0094222 A1* | 3/2017 | Tangeland ............. H04N 7/147 |
| 2017/0372749 A1* | 12/2017 | Ramaswamy ......... G11B 27/34 |
| 2018/0268221 A1 | 9/2018 | Bostick et al. |

OTHER PUBLICATIONS

Xu et al., "A hierarchical video annotation system", 2009 IEEE International Conference on Semantic Computing (Year: 2009).

\* cited by examiner

VIDEO IMAGE OVERLAY OF AN EVENT PERFORMANCE

BACKGROUND

The present invention relates generally cognitive video analysis and, more particularly, to a system and method for the overlaying video segments of the actions of audience members with video segments of an event performer during an event performance.

During events such as awards ceremonies, presentations, stage performances, etc., video cameras are often placed in throughout the event area to capture both the action occurring on-stage and the audience reaction to the events occurring on-stage. Video cameras capture and record the movements and action of people on-stage during the event performances and the movements and action of the audience members. The data captured by the video cameras can be processed and stored for later utilization.

The data captured by the video cameras may be used to gauge the reaction of audience members to specific events occurring on-stage. This is useful in both social and business settings where analyzing specific video segments of the awards ceremonies, event presentations, or stage performances is used in the understanding of the action occurring on-stage.

SUMMARY

In an aspect of the invention, there is a computer implemented method that includes: identifying, by a computer device, an event performer in video content; identifying, by the computer device, an audience member in the video content that has a social network relationship to the event performer; correlating, by the computer device, an action of the event performer in the video content to an action of the audience member in the video content; and generating, by the computer device, a composite image comprising an image of the action of the event performer and an image of the action of the audience member.

In another aspect of the invention, there is a computer program product comprising a computer readable storage medium having program instructions embodied therewith. The program instructions are executable by a computing device to cause the computing device to: obtain video content of an event from a video server, wherein the video content comprises video data captured by plural cameras at the event; obtain metadata associated with the event; identify an event performer in the video content based on analyzing the video content and the metadata; identify plural audience members in the video content that have a social network relation with the event performer; correlate an action of the event performer in the video content to actions of the plural audience members in the video content; and generate a composite image comprising an image of the action of the event performer and at least one image of the actions of the plural audience members In another aspect of the invention, there is a system comprising: a CPU, a computer readable memory and a computer readable storage medium associated with a computing device; program instructions to obtain video content of an event from a video server, wherein the video content comprises video data captured by plural cameras at the event; program instructions to obtain metadata associated with the event; program instructions to identify an event performer in the video content based on analyzing the video content and the metadata; program instructions to identify an audience member in the video content that has a social network relation with the event performer; program instructions to correlate an action of the event performer in the video content to an action of the audience member in the video content; and program instructions to generate a composite image comprising an image of the action of the event performer and an image of the action of the audience member. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally cognitive video analysis and, more particularly, to a system and method for the overlaying video segments of the actions of audience members with video segments of an event performer during an event performance. Embodiments of the invention recognize that, although technology exists for measuring and analyzing audience reaction to video, there is no effective way to provide an overlay of video segments of audience reaction to portions of an event performance. Aspects of the invention are directed to mapping specific video segments of the actions of the event performer to specific video segments of the actions of the audience member(s) during a specified moment of the event, e.g., awards ceremonies, event presentations, product launches, stage performances, etc. In embodiments, while the event is occurring, cameras located around the venue of the event capture the actions of the event performer and the actions of the audience member(s). The actions captured by the cameras are stored in a video server for later retrieval and processing including but not limited to: identifying a participant in the event; identifying at least audience member having a social relationship with the participant; correlating facial expressions and/or gestures of the at least audience member to a moment involving the participant; and generating video content depicting the moment involving the participant overlaid with the correlated facial expressions and/or gestures of the at least audience member.

Aspects of the invention include retrieving video content of the event from a video server and metadata of the event. For example, a system may retrieve the full video content of an awards ceremony stored in the video server or retrieve portions of the video content of the awards ceremony stored in the video server. After retrieving the video content of the awards ceremony, the system may include analyzing event metadata and the video content to determine information about an event. For example, embodiments of the invention may analyze the metadata to determine that the type of the event is an awards ceremony and flag important moments in the awards ceremony such as the timing of presentation of the award, the seating arrangement of the awards ceremony, the location of the awards ceremony, along with other information about the awards ceremony.

Other aspects of the invention are directed to analyzing the video content to identify the event performer in the event and actions of the event performer at a specified moment in the event based on the metadata and the analysis the video content. Still other aspects are directed to analyzing the video content to identify audience member(s) of the event that have a relationship with the event performer. For example, after identifying the event performer based on the metadata and the analysis the video content, the system may identify audience member(s) that have a business relationship with the event performer based on the social network sites of the event performer. After identifying the audience member(s) that have a relationship with the event performer, the system may analyze the video content to identify actions of the audience member(s) at the specified moment in the event based on the metadata and the analysis the retrieved video content.

Still other aspects of the invention are directed to correlating the video content of the actions of the event performer at the specified moment to the video content of the actions of the audience member(s) at the specified moment. For example, during an awards ceremony, the system may correlate the video content of the actions of the event performer when receiving the award to the video content of the actions of the family members of the event performer when the presentation of the award occurs.

Other aspects of the invention include overlaying the video content of the actions of the event performer with the actions of the audience member(s) during the specified moment to generate a video still image. For example, during an awards ceremony, embodiments of the invention may overlay an image of the moment the award is presented to the event performer and images of the actions of the audience member(s) to the presentation of the award. The invention my then generate the video still image of the moment when the award is presented.

Other aspects of the invention include searching the video content for specific reactions of the audience member(s) during important moments in the event. For example, embodiments of the invention may search the video content for specific reactions of a family member of the event performer when the event performer gives a speech after being presented with the award.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
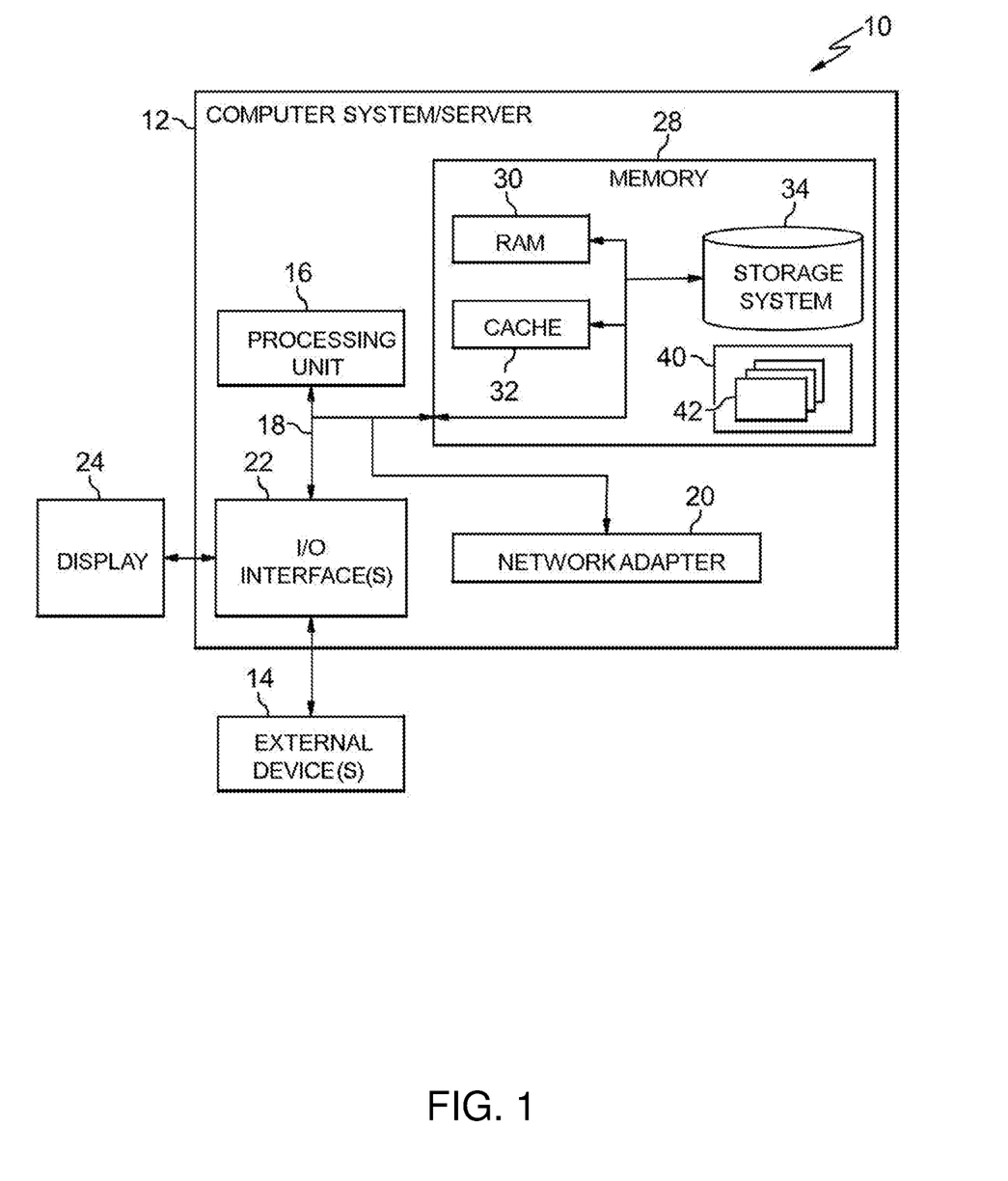
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
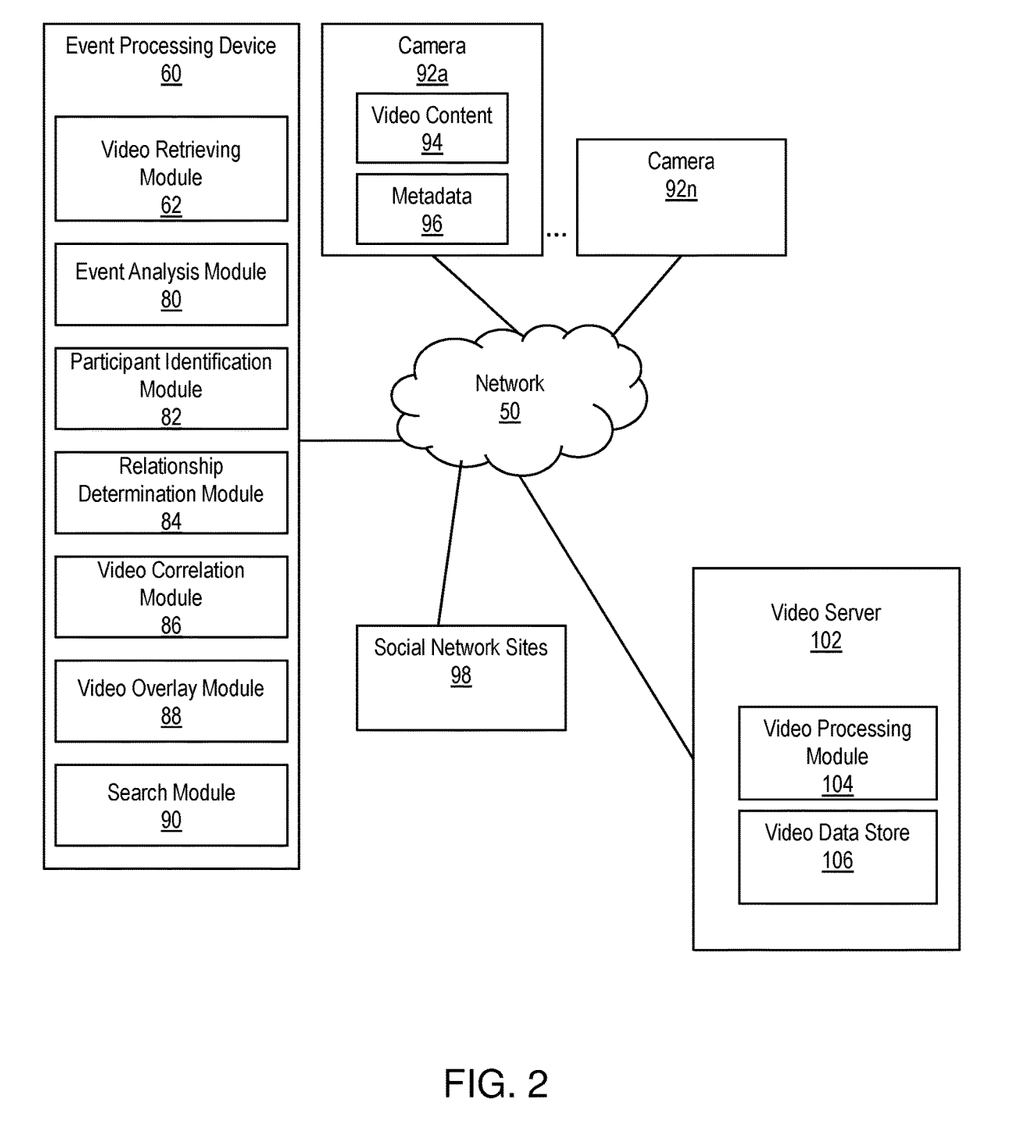
FIG. 2 shows an exemplary environment in accordance with aspects of the invention.

FIG. 2 shows an exemplary environment in accordance with aspects of the invention. The environment includes an event processing device 60 which may be a computer system 12 of FIG. 1. In embodiments, the event processing device 60 includes a video retrieving module 62 that retrieves video content of the event from a video server 102 and event metadata, an event analysis module 80 that determines information about an event, a participant identification module 82 that identifies participants involved in the event, and a relationship determination module 84 that determines relationships between the participants involved in the event. The event processing device 60 may also include a video correlation module 86 that correlates video content of specific moments in the retrieved video content, a video overlay module 88 that overlays video content of specific moments over each other to generate a video still image, and a search module 90 that searches for specific moments in the retrieved video content. Each of the modules 62, 80, 82, 84, 86, 88, and 90 may comprise one or more program modules 42 as described with respect to FIG. 1. In embodiments, the event processing device 60 may include additional or fewer modules than those shown in FIG. 2. In embodiments, separate modules may be integrated into a single computing component or module. Additionally, or alternatively, a single module may be implemented as multiple computing components or modules.

Referring to FIG. 2, the event processing device 60 may be connected to a network 50 via the network adapter 20 of FIG. 1. The network 50 may be any suitable communication network or combination of networks, such as a local area network (LAN), a general wide area network (WAN), a public network (e.g., the Internet), a 3G network, a Long-Term Evolution (LTE) network, and/or 5G network.

The event processing device 60 may be configured as a special purpose computing device that is in communication with one or more cameras 92a-n and the video server 102 over the network 50. The cameras 92a-n may be digital cameras which may include one or more components of a computer system similar computer system 12 of FIG. 1, to store and process video information in a memory similar to memory 28 of FIG. 1. The cameras 92a-n are represented as camera 92a to camera 92n, where n may be any appropriate number of separate cameras that provide video information to the video server 102 and the event processing device 60. In embodiments, the event processing device 60 may be a network subscriber's computer device, such as a laptop computer, smartphone, tablet, or other network device that has the ability to connect to the cameras 92a-n and the video server 102 over the network 50.

Each camera 92a-n comprise a video camera computer system configured to retain video content 94 of an event such as an awards ceremony, a performance, a contest, a presentation, etc. The video camera computer system of each camera 92a-n may also be configured to retain metadata 96 of an event such as event location, event time, event venue, seating assignments of participants of the event, known participants in the event, among others. The video content 94 and the metadata 96 of the event may be transmitted over the network 50 to be stored in a video data store 106 of the video server 102. The video server 102 may also include a video processing module 104 that processes video content 94 and metadata 96 of the event recorded by the cameras 92a-n. Additionally or alternatively, the computer system in the cameras 92a-n may also process and store video content 94 and metadata 96 of the event. The video server 102 may be a computer system similar to computer system 12 in FIG. 1 where the video data store 106 corresponds to storage system 34 in FIG. 1 and where the video processing module 104 may corresponds to the program modules 42 in FIG. 1.

Still referring to FIG. 2, as noted above, the video retrieving module 62 is configured to retrieve stored video content of the event from the video server 102 and the event metadata from cameras 92a-n. In aspects, a system may retrieve the full video content of the event stored in the video server 102 or retrieve portions of the video content of the event stored in the video server 102 based on the event analysis by the video retrieving module 62. For example, based on determining that the event is a business presentation, the video retrieving module 62 may retrieve video content of the entire businesses presentation. In another example, based on determining that the event is an awards ceremony, the video retrieving module 62 may retrieve portions of the video content of the awards ceremony. In this example, the video retrieving module 62 retrieves video content of the awards ceremony that encompasses only the video moments surrounding or near in time to the actual presentation of the award from the video server 102.

In accordance with aspects of the invention, the event analysis module 80 is configured to analyze event metadata and analyze the video content though a semantic analysis to determine information about an event used by the video retrieving module 62, such as determining the type of the event and determining important moments in the event. Semantic analysis of the video content of the event is rules based analysis may be used to assess and identify a type of event in the video content, i.e., to classify the event as one of a predefined type such as, for example, is an awards ceremony, a performance ceremony, a business presentation, product launch, etc. For example, based on the video retrieving module 62 retrieving the video content, the event analysis module 80 may analyze the metadata 96 and analyze the video content, using semantic analysis, to determine that the event is an awards ceremony. In some aspects, based on analysis of the metadata 96, the event analysis module 80 may flag or note the time of the presentation of the award to the instances event performer according to a schedule of the awards ceremony in the metadata 96. In other aspects, the event analysis module 80 may analyze the metadata 96 to determine a seating arrangement of the audience member(s) of the event. In other aspects, the event analysis module 80 may analyze the video content to determine location of the event, venue of the event, and setting of the event, among others.

In accordance with aspects of the invention, the participant identification module 82 is configured to analyze the video content to identify the event performer in the event based on the metadata 96 and a contextual analysis of the retrieved video content. The contextual analysis is an analysis of the video content that assesses the video content terms of actions occurring in the video content. For example, based on the event analysis module 80 determining that the event is a business presentation, the participant identification module 82 analyzes the metadata 96 and the video content according to the contextual analysis process to identify the event performer as the individual giving the business presentation. In another example, based on the event analysis module 80 determining that the event is an awards ceremony, the participant identification module 82 analyzes the metadata 96 and the video content according to the contextual analysis process to identify the event performer as an individual in the video content receiving the award. In embodiments, the participant identification module 82 is also configured to determine an identity of the event performer. For example, the participant identification module 82 may analyze the event metadata to determine a name of the individual scheduled to receive an award, or the name of the individual giving a product launch presentation.

In embodiments, the participant identification module 82 is configured to analyze the video content to determine actions of the event performer at a moment in the event based on the metadata 96 and the analysis of the video content. For example, based on the event analysis module 80 determining that the event is an awards ceremony, the participant identification module 82 analyzes the metadata 96 and the video content according to the contextual analysis process to determine actions of the event performer at the moment the award is presented.

In other aspects, the participant identification module 82 is configured to analyze the video content to identify one or more audience members in the video content that have a social relationship with the identified event performer. The determining of the relationship may be a comparison of the video content of the audience members to photographs in the social network sites 98 of the event performer. For example, based on the participant identification module 82 identifying the event performer, the participant relationship module 84 accesses the social network sites 98 of the event performer, and uses computer-based facial recognition techniques to compare images of individuals at the social network sites 98 of the event performer to images of the audience members at the event. Based on this comparison, the participant relationship module 84 is able to determine if any of the audience members at the event are also people shown in images on the social network sites 98 of the event performer. In embodiments, any such audience member is deemed to have a social relationship with the event performer.

In other aspects, the participant identification module 82 is configured to analyze the video content to determine actions of the identified audience members at a moment in the video content of the event based on the metadata 96, the analysis of the video content, and the relationship between the event performer and the identified audience members. For example, based on the event analysis module 80 determining that the event is an awards ceremony, the participant identification module 82 identifying the event performer and the identified audience members, and the participant relationship module 84 determining the relationship between the event performer and the identified audience members, the participant identification module 82 analyzes and the video content to determine actions of the identified audience members at the moment the award is presented. The actions may include, but are not limited to, facial expressions (e.g., smiling, frowning, disinterested, etc.) and/or physical gestures (e.g., clapping, waving, etc.).

In embodiments, the video correlation module 86 is configured to correlate the video content of the actions of the event performer and the actions of the identified audience members in a specified moment of the event. For example, based on the event analysis module 80 determining that the event is an awards ceremony and the participant identification module 82 identifying the actions of the event performer and the actions of the identified audience members at a moment in the event, the video correlation module 86 may correlate the video content of the actions of the event performer when receiving the award to the video content of the actions of the identified audience members when the presentation of the award occurs. For example, the video correlation module 86 may correlate the video content of facial reactions and body gestures of the identified audience members at the moment of the presentation of the award to the event performer. For example, based on determining that the determined moment occurs at time "x" (e.g., the event performer receives an award at time "x"), the video correlation module 86 tags portions of the video content of the event performer at time "x" and also tags portions of the video content of the identified audience members at time "x". In this manner, the actions of the identified audience members are correlated to the action of the event performer at the identified moment.

The video overlay module 88 is configured to overlay the video content of the actions of the event performer in the specified moment to the video content of the actions of the audience member in the specified moment based on the correlation by the video correlation module 86. In other aspects, the video overlay module is configured to generate a video still image after the overlay of the video content of the event performer to the video content of the audience member at the specified moment. The video still image is a composite image of the event performer and the audience member. For example, based on the video correlation module 86 correlating the video content of captures facial reactions and body gestures of the audience member at the moment of the presentation of the award to the event performer during an awards ceremony, the video overlay module 88 overlays the video frame image of a moment of the clapping of a family member of the audience member with the video frame image of the actual award presentation to the event performer and generates a composite video still image of both the event performer and the audience member.

In another aspect, the video correlation module 86 is configured to rank the identified audience members based on a determined relationship strength of the social relationship between the respective audience members to the event performer. In embodiments, the relationship strength between a respective audience member and the event performer is determined based on the social network data from the social network sites 98 of the event performer. For example, the relationship strength may be based on tags, comments, or posts associated with photos in which the audience member appears on one or more of the social network sites 98 of the event performer.

The system may identify plural audience members that have a social network relationship with the event performer, and the system may determine a different respective relationship strength for each identified audience member. The video overlay module 88 may be configured with a setting that defines a maximum number of images of audience members that can be included in the video still image. In situations where the number of identified audience members exceeds the maximum number of images of audience members that can be included in the video still image, the video overlay module 88 may be configured to select a subset of the identified audience members to include in the video still image based on the determined relationships strengths. For example, if six audience members are identified as having a relationship to the event performer and there is a maximum number of four images of audience members in the video still image, then the video overlay module 88 selects the four audience members that have the highest relationship strengths among the six identified audience members.

The search module 90 is configured to search the video content based on one or more search parameters included in a search input provided by a user. Search parameters may include, but are not limited to: a specified time range in the video content; type of action by an audience member (e.g., a type of facial expression such as smiling or frowning, or a type of gesture such as clapping); and type of determined social network relationship between an audience member and the event performer. For example, the search module may search the video content of a product launch to search for reaction of the audience member during different segments of the video content of the product launch, such as searching the segment in the video content for the reaction of the audience member during the presentation of new products or features of the product. In another example, the search module 90 may search the video content for a search of the audience member clapping hands during the presentation of the award. In another example, the search module 90 may search the video content based on the name of the audience member or the relationship of the audience member to the event performer. For example, the parameter may include identifying the number of class teachers are reacting during the presentation of the award to the event performer.

In accordance with aspects of the invention, based on the search module 90 searching the video content based on the parameter, the video overlay module 88 may utilize the results of the search of the video content to overlay the video content of action of the event performer with the reaction of the audience member to generate the composite image of the event performer and the audience member for the specified parameter.

The search module 90 may be similar to the I/O interface 22 and is a software product that provides an interface between a user of event processing device 60 and the modules 62, 80, 82, 84, 86, 88, and 90. A user interface, such as I/O interface 22, refers to the information (such as graphic, text, and sound) a program presents to a user and the control sequences the user employs to search for the video content by the search module 90. In one embodiment, the I/O interface 22 is a graphical user interface (GUI).

Figure 3:
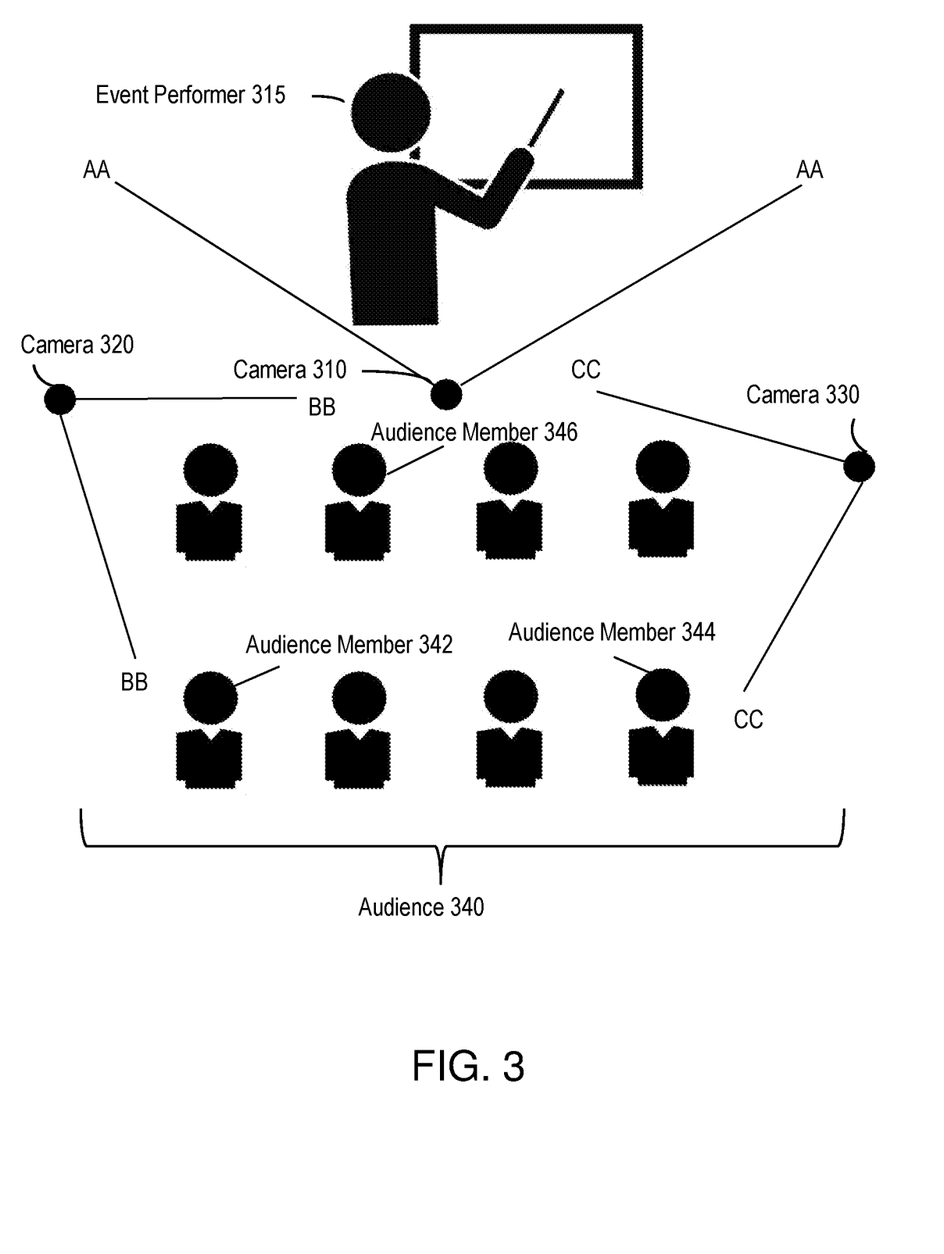
FIG. 3 shows an example of video capturing of an event performance in accordance with aspects of the invention.

FIG. 3 shows an example of video capturing of the event performance in accordance with aspects of the invention. In FIG. 3, an event performer 315 gives a presentation to members of an audience 340. Camera 310 records the actions of the event performer 315 during the event, e.g., in a field of view defined by the lines AA. Cameras 320 and 330 record the actions of the audience members during the event, e.g., in a field of view defined by BB and CC, respectively. Cameras 310, 320, 330 each correspond to one of cameras 92*a-n* described with respect to FIG. 2. The video content recorded by each camera 310, 320 and 330 is transmitted to the video server 102 for storing. In this example, the event processing device 60 analyzes the metadata and the video content, in the manner described with respect to FIG. 2, and identifies that the audience members 342, 344, 346 have a social relation with the event performer.

Figure 4:
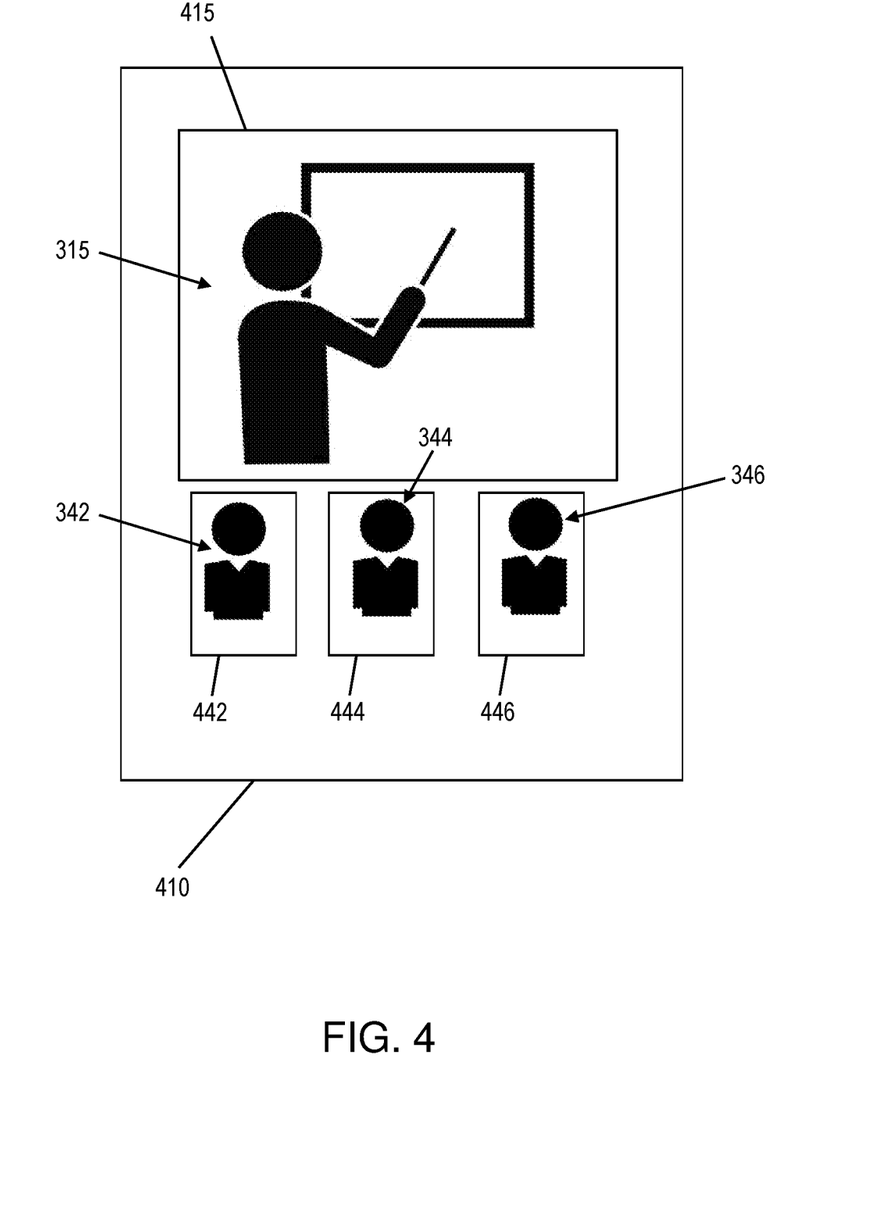
FIG. 4 shows an example of overlaying of audience reaction to a video segment of an event performance in accordance with aspects of the invention.

FIG. 4 shows an example of an image 410 that comprises images 442, 444, 446 of the identified audience members 342, 344, 346 overlaid onto an image 415 of the event performer 315. The images 415, 442, 444, 446 are obtained from the video content taken by one or more of the cameras 310, 320, 330 and stored at video server 102. The images 415, 442, 444, 446 coincide with a moment of the event, e.g., a key part of the presentation such as the presenting of an award or the announcement of a new product, the moment having been determined by the system in the manner described with respect to FIG. 2. In this manner, the image 410 simultaneously shows (i) the image 415 of the event performer 315 during a moment of the event, and (ii) the images 442, 444, 446 of the identified audience members 342, 344, 346 during the same moment of the event. In this manner, a user may review the image 415 to see how the identified audience members 342, 344, 346 reacted during the moment, e.g., their facial expressions, gestures, etc. According to aspects of the invention, the image 410 may be presented on a display of the event processing device 60 and/or stored in memory at the event processing device 60 for later viewing by a user.

Figure 5:
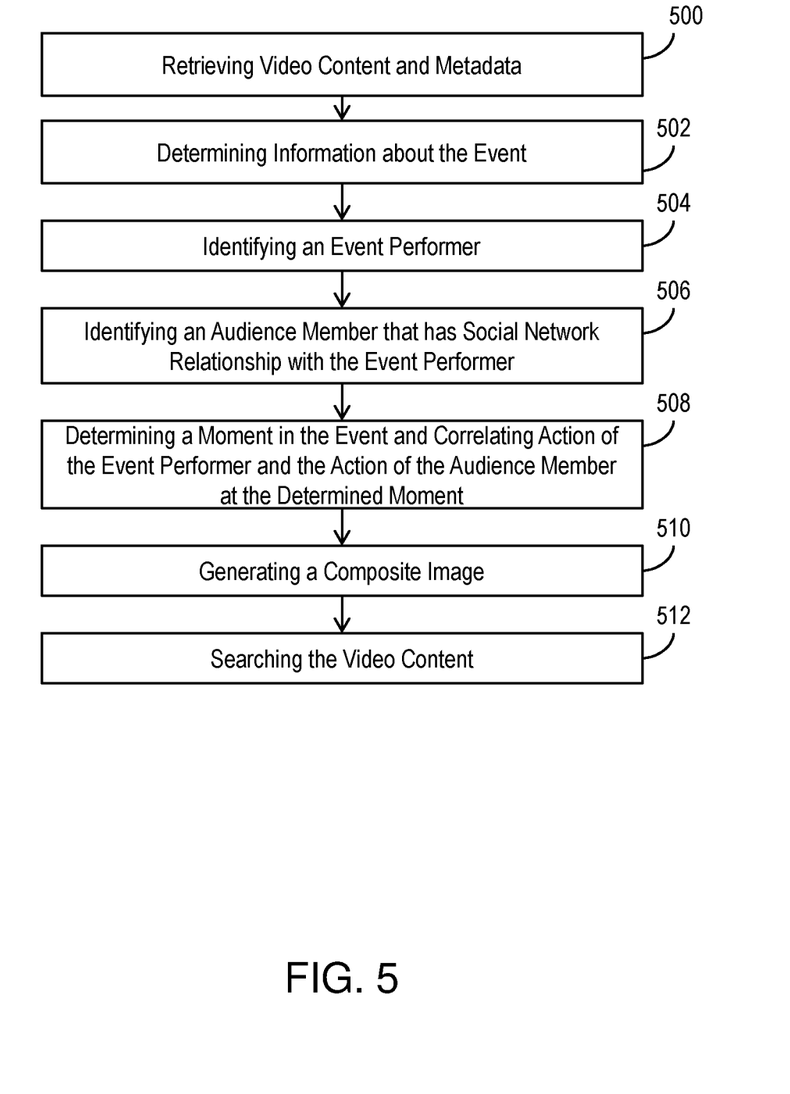
FIG. 5 shows a flowchart of steps of a method in accordance with aspects of the invention.

FIG. 5 shows a flowchart of steps of a method in accordance with aspects of the invention. The steps of the method may be performed in the system of FIG. 2 and are described with reference to the elements and functions described in FIG. 2.

Referring to FIG. 5, the event processing device 60 retrieves video content of the event and metadata about the event from the video server 102. In aspects, step 500 is performed in the manner described with respect to FIG. 2 and includes retrieving the entire video stream of the event or partial video content of the event from the video server 102 via the network 50.

At step 502, the event processing device 60 determines information about the event. In embodiments, as described with respect to FIG. 2, the event analysis module 80 analyzes the metadata to determine information including at least one of: type of event; identity of event performer; identity of audience members; seating arrangement of audience members.

At step 504, the event processing device 60 identifies the event performer (e.g., participant). Step 504 may be performed in the manner described with respect to FIG. 2, and may include the participant identification module 82 identifying the event performer based on at least one of: analyzing the metadata; semantic analysis of the video content; contextual analysis of the video content; and facial recognition analysis of the video content.

At step 506, the event processing device 60 identifies at least one audience member that has a social relation with the identified event performer. In embodiments, as described with respect to FIG. 2, the participant relationship module 84 determines at least one audience member having a social relation with the identified event performer based on at least one of: analyzing the metadata; and facial recognition analysis of the video content and social network data from one or more social network sites 98 of the identified event performer.

At step 508, the event processing device 60 determines a moment in the event and correlates action of the identified event performer to action of the identified audience members based on the determined moment. Step 508 may be performed in the manner described with respect to FIG. 2, and may include the event analysis module 80 determining the moment of the event based on at least one of: analyzing the metadata; semantic analysis of the video content; contextual analysis of the video content. Step 508 may also include the video correlation module 86 correlating action of the identified event performer to action of the identified audience members based on a time that the determined moment occurred during the event. Step 508 may include the video correlation module 86 tagging certain portions (i.e., frames) of the video content that correspond to the determined moment.

At step 510, the event processing device 60 generates a composite image comprising at least one image of the identified audience members overlaid onto an image of the identified event performer. Step 510 is illustrated by the example depicted in FIG. 4 in which the system generates an image 410 that includes: (i) images 442, 444, 446 of the identified audience members 342, 344, 346, and (ii) an image 415 of the identified event performer 315, all of the images 415, 442, 444, 446 being correlated in time to an determined moment determined moment during the event. In this manner, the composite image generated at step 510 simultaneously shows the action of the event performer during the moment and the actions of the identified related audience members during the same moment.

At step 512, the event processing device 60 searches the video content based on a one or more parameters received in user search input. In aspects, step 512 is performed in the manner described with respect to FIG. 2 and includes searching the video content for actions of the audience member(s) during moments in the event based on the video retrieving module 62 retrieving the video content and the participant identification module 82 identifying the audience member(s). Step 512 may include the event processing device 60 presenting a search user interface (UI), receiving user input (e.g., one or more search parameters) via the UI, and generating and displaying a composite image (e.g., as at step 510) based on the user input.

In embodiments, a service provider could offer to perform the processes described herein. In this case, the service provider can create, maintain, deploy, support, etc., the computer infrastructure that performs the process steps of the invention for one or more customers. These customers may be, for example, any business that requires mapping audience reaction to video segments of an event performance. In return, the service provider can receive payment from the customer(s) under a subscription and/or fee agreement and/or the service provider can receive payment from the sale of advertising content to one or more third parties.

In still another embodiment, the invention provides a computer-implemented method for mapping audience reaction to video segments of an event performance. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    identifying, by a computer device, an event performer in video content;
    identifying, by the computer device, an audience member in the video content that has a social network relationship to the event performer;
    correlating, by the computer device, an action of the event performer in the video content to an action of the audience member in the video content;
    generating, by the computer device, a composite image comprising an image of the action of the event performer and an image of the action of the audience member;
    displaying, by the computer device, an interface;
    receiving, by the computer device, a search input via the interface; and
    searching, by the computer device, the video content based on the search input,
    wherein the identifying the event performer is performed based on the search input.

2. The method of claim 1, wherein the identifying the event performer, the identifying the audience member, the correlating, and the generating are performed based on the search input.

3. The method of claim 2, wherein the search input comprises a specified time range in the video content.

4. The method of claim 2, wherein the search input comprises a type of action by the audience member.

5. The method of claim 2, wherein the search input comprises a type of determined social network relationship between the audience member and the event performer.

6. The method of claim 2, wherein the search input comprises:
    a specified time range in the video content;
    a type of action by the audience member; and
    a type of determined social network relationship between the audience member and the event performer.

7. The method of claim 2, wherein the generating comprises overlaying video content of the action of the event performer with the action of the audience member to generate the composite image of the event performer and the audience member for a parameter of the search input.

8. A computer program product comprising a computer readable storage medium having program instructions embodied therewith, the program instructions executable by a computing device to cause the computing device to:
    identify an event performer in video content;
    identify an audience member in the video content that has a social network relationship to the event performer;
    correlate an action of the event performer in the video content to an action of the audience member in the video content;
    generate a composite image comprising an image of the action of the event performer and an image of the action of the audience member;
    display an interface;

receive a search input via the interface; and search the video content based on the search input, wherein the identifying the audience member is performed based on the search input.

9. The computer program product of claim 8, wherein the identifying the event performer, the identifying the audience member, the correlating, and the generating are performed based on the search input.

10. The computer program product of claim 9, wherein the search input comprises a specified time range in the video content.

11. The computer program product of claim 9, wherein the search input comprises a type of action by the audience member.

12. The computer program product of claim 9, wherein the search input comprises a type of determined social network relationship between the audience member and the event performer.

13. The computer program product of claim 9, wherein the generating comprises overlaying video content of the action of the event performer with the action of the audience member to generate the composite image of the event performer and the audience member for a parameter of the search input.

14. A system comprising:

a processor, a computer readable memory and a computer readable storage medium associated with a computing device; and program instructions stored on the computer readable storage medium for execution by the processor via the computer readable memory, wherein execution of the program instructions causes the computer device to:

identify an event performer in video content;

identify an audience member in the video content that has a social network relationship to the event performer;

correlate an action of the event performer in the video content to an action of the audience member in the video content;

generate a composite image comprising an image of the action of the event performer and an image of the action of the audience member;

display an interface;

receive a search input via the interface; and search the video content based on the search input, wherein the correlating and the generating are performed based on the search input.

15. The system of claim 14, wherein the identifying the event performer, the identifying the audience member, the correlating, and the generating are performed based on the search input.

16. The system of claim 15, wherein the search input comprises a specified time range in the video content.

17. The system of claim 15, wherein the search input comprises a type of action by the audience member.

18. The system of claim 17, wherein the type of action by the audience member is a facial expression.

19. The system of claim 15, wherein the search input comprises a type of determined social network relationship between the audience member and the event performer.

20. The system of claim 15, wherein the generating comprises overlaying video content of the action of the event performer with the action of the audience member to generate the composite image of the event performer and the audience member for a parameter of the search input.

* * * * *